UNITED STATES PATENT OFFICE.

ERWIN SEVERNS, OF ILLINOIS CITY, ILLINOIS.

IMPROVEMENT IN COMPOUNDS FOR DESTROYING INSECTS.

Specification forming part of Letters Patent No. 151,317, dated May 26, 1874; application filed June 23, 1873.

*To all whom it may concern:*

Be it known that I, ERWIN SEVERNS, of Illinois City, in the county of Rock Island and State of Illinois, have invented certain new and useful Improvements in Chinch-Bug and Vermin Destroyer for Wheat and other grain; and I do hereby declare the following to be a full, clear, and exact description of the invention, such as will enable others skilled in the art to which it pertains to make and use it.

My invention consists of a new and improved compound composed of the several ingredients and parts more fully explained hereinafter.

The object of my compound is for preventing the chinch-bug from penetrating the grain before and while in growth, and for this purpose the compound is thoroughly mixed and sowed at the same time that the wheat or other grain is sown, thereby destroying any eggs that may be deposited in the soil, and by this means there can be no bugs in the wheat while in growth, as they cannot exist where my compound is applied. The paris-green, one of the ingredients, is not used when the compound is sown with the grain. This ingredient is only used on fields where the bug is already at work. Thus it will be seen that the paris-green may be dispensed with in such cases.

My compound is composed of sulphate of iron, paris-green, sulphur, common salt, and fresh lime.

The following are the proportions of the ingredients that I have found to answer best in practice: Sulphate of iron, one part; sulphur, ten parts; salt, ten parts; lime, fifty parts; paris-green, one part.

These are pulverized and thoroughly mixed, and then sown with the grain, or can be mixed with the grain before sowing. The paris-green then is omitted from the compound. The latter ingredient is only used on fields that are already infested by the bugs, or the paris-green can be omitted altogether from the compound, as herein shown.

What I claim as new, and desire to secure by Letters Patent, is—

The compound herein described, consisting of the following ingredients: Sulphate of iron, sulphur, salt, lime, and paris-green, in about the proportions specified.

In testimony that I claim the foregoing I have hereunto set my hand this 21st day of June, 1873.

ERWIN SEVERNS.

Witnesses:
 THOMAS C. CONNOLLY,
 OSCAR C. FOX.